United States Patent
Wang et al.

(10) Patent No.: US 10,509,981 B2
(45) Date of Patent: Dec. 17, 2019

(54) METHOD AND APPARATUS FOR INFRARED THERMAL IMAGE CONTOUR EXTRACTION

(71) Applicants: BOE TECHNOLOGY GROUP CO., LTD., Beijing (CN); BEIJING BOE MULTIMEDIA TECHNOLOGY CO., LTD., Beijing (CN)

(72) Inventors: Jianting Wang, Beijing (CN); Jianzi He, Beijing (CN); Junning Su, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

( * ) Notice: Subject to any disclaimer, the term of this patent is extended or adjusted under 35 U.S.C. 154(b) by 150 days.

(21) Appl. No.: 15/517,963

(22) PCT Filed: Aug. 15, 2016

(86) PCT No.: PCT/CN2016/095261
§ 371 (c)(1),
(2) Date: Apr. 9, 2017

(87) PCT Pub. No.: WO2017/133217
PCT Pub. Date: Aug. 10, 2017

(65) Prior Publication Data
US 2018/0046878 A1    Feb. 15, 2018

(30) Foreign Application Priority Data

Feb. 3, 2016   (CN) .......................... 2016 1 0078144

(51) Int. Cl.
*G06K 9/48* (2006.01)
*G06K 9/46* (2006.01)
(Continued)

(52) U.S. Cl.
CPC ....... *G06K 9/4642* (2013.01); *G06K 9/00234* (2013.01); *G06K 9/00369* (2013.01);
(Continued)

(58) Field of Classification Search
CPC ............. G06K 9/4642; G06K 9/00234; G06K 9/6212; G06K 9/38; G06K 9/00369; G06K 9/4652; G06K 9/4604; G06K 9/2018
See application file for complete search history.

(56) References Cited

U.S. PATENT DOCUMENTS

2012/0106782 A1* 5/2012 Nathan .............. G06K 9/00771
382/103
2012/0163657 A1* 6/2012 Shellshear ......... G06K 9/00751
382/103
(Continued)

FOREIGN PATENT DOCUMENTS

CN    102034106 A    4/2011
CN    104599271 a    5/2015
(Continued)

OTHER PUBLICATIONS

Ren Bin et al., An automatic thresholding method for infrared thermal image segmentation; Journal of Anhui University Natural Science Edition, Jun. 30, 1996, No. 2, vol. 20, sections 1-2.
(Continued)

*Primary Examiner* — Samir A Ahmed
(74) *Attorney, Agent, or Firm* — Syncoda LLC; Feng Ma

(57) ABSTRACT

The present disclosure provides a method and apparatus for infrared thermal image contour extraction. The method includes: obtaining an infrared thermal image; and determining histograms based on grayscale image of the infrared thermal image, determining segmentation thresholds of the infrared image based on the histograms, and extracting a
(Continued)

contour based on the segmentation thresholds. The apparatus includes an image acquisition circuit, configured to capture an infrared thermal image; and a processing circuit, configured to determine histograms based on greyscale images of the infrared thermal image, to determine segmentation thresholds of the infrared thermal image based on the histograms, and to extract a contour based on segmentation thresholds.

15 Claims, 7 Drawing Sheets

(51) Int. Cl.
| | |
|---|---|
| G06K 9/20 | (2006.01) |
| G06K 9/00 | (2006.01) |
| G06K 9/38 | (2006.01) |
| G06K 9/62 | (2006.01) |
| G06T 7/13 | (2017.01) |
| G06T 7/194 | (2017.01) |
| G06T 7/136 | (2017.01) |

(52) U.S. Cl.
CPC ............ *G06K 9/2018* (2013.01); *G06K 9/38* (2013.01); *G06K 9/4604* (2013.01); *G06K 9/4652* (2013.01); *G06K 9/6212* (2013.01); *G06T 7/13* (2017.01); *G06T 7/136* (2017.01); *G06T 7/194* (2017.01); *G06T 2207/10048* (2013.01)

(56) References Cited

U.S. PATENT DOCUMENTS

| | | | | |
|---|---|---|---|---|
| 2015/0156407 | A1* | 6/2015 | Wang | H04N 5/33 348/164 |
| 2015/0169980 | A1 | 6/2015 | Matsuda et al. | |
| 2015/0234454 | A1* | 8/2015 | Kurz | H04N 5/33 345/156 |
| 2015/0244946 | A1* | 8/2015 | Agaian | H04N 5/33 348/164 |
| 2015/0245787 | A1* | 9/2015 | Kyal | A61B 5/1128 600/476 |
| 2016/0022193 | A1* | 1/2016 | Rau | A61B 5/165 600/301 |
| 2017/0109599 | A1* | 4/2017 | Gupta | G06K 9/4652 |

FOREIGN PATENT DOCUMENTS

| | | |
|---|---|---|
| CN | 104952060 A | 9/2015 |
| CN | 105096333 A | 11/2015 |

OTHER PUBLICATIONS

International Search Report and Written Opinion dated Nov. 10, 2016 in PCT/CN2016/095261.
1st Office Action dated Jun. 19, 2018 in CN201610078144.8.
Extended European Search Report dated Aug. 6, 2019 in EP16838049.1.
Zainul Abdin Jaffery et al., "Design of Early fault detection technique for electrical assets using infrared thermograms," Electrical Power and Energy Systems, 63 (2014),; 753-759.

\* cited by examiner

S11: Capturing a static infrared thermal video comprising multiple frames of the infrared thermal image through a video capturing module

S12: Performing decoding and analog/digital conversion of the infrared thermal video comprising multiple frames of infrared thermal images through a video decoding module, and storing the digital infrared thermal images in a data storage module.

S13: Calculating an average of multiple frames of the digital infrared thermal images to obtain one frame of the infrared thermal image through an image calculation module

FIG. 3

S51: Comparing the segmentation coordinates of the greyscale image of the red component with the inverted greyscale image of the blue component to obtain segmentation coordinates of the inverted greyscale image of the blue component that are different from those of the greyscale image of the red component

S52: Comparing the different segmentation coordinates with the segmentation coordinates of the greyscale image of the green component, and if matching, retaining the different segmentation coordinates, otherwise removing the different segmentation coordinates

S53: Using the segmentation coordinates of the greyscale image of the red component and the segmentation coordinates of the inverted greyscale image of the retained blue component as windows, extracting and displaying the contour of the infrared thermal image

FIG. 4

METHOD AND APPARATUS FOR INFRARED THERMAL IMAGE CONTOUR EXTRACTION

CROSS-REFERENCE TO RELATED APPLICATION

The present application claims priority to Chinese Patent Application No. 201610078144.8 filed on Feb. 3, 2016, the disclosure of which is hereby incorporated by reference in its entirety.

TECHNICAL FIELD

The present disclosure relates generally to the field of display technologies, and more specifically to a method and an apparatus for infrared (IR) thermal image contour extraction.

BACKGROUND

Contour of an image is a basic characteristic of the image, and generally carries most of the information of it, and thus it is often applied in image applications of a deeper level. It has wide-spread applications in fields such as image recognition, image segmentation, image enhancement, and image compression, and it is also the foundation of image processing. Therefore, we need to detect an image and extract its contour.

Contour extraction is considered to be a very important process in many intelligent vision systems. However, methods for infrared thermal image contour extraction are very complex in existing technologies. Therefore, a simple and easy-to-operate method for contour recognition is especially important.

SUMMARY

The technical problems that need to be solved by the present disclosure include providing a simple and precise method and apparatus for thermal image contour extraction to solve the problem that the methods for contour extraction in existing technologies are all very complex.

In an aspect, the present disclosure provides a method for infrared thermal image contour extraction, which include: obtaining an infrared thermal image; and determining histograms based on grayscale image of the infrared thermal image; determining segmentation thresholds of the infrared image based on the histograms; and extracting a contour based on the segmentation thresholds.

The step of obtaining an infrared thermal image can comprise the following sub-steps: capturing a static infrared thermal video comprising a plurality of frames of the infrared thermal image; performing decoding and analog/digital conversion of the static infrared thermal video, and storing a plurality of frames of digital infrared thermal images obtained from the analog/digital conversion; and calculating an average of the plurality of frames of digital infrared thermal images to obtain one frame of the infrared thermal image.

An output format of the static infrared thermal video can be PAL, NTSC, or NECAM. In some embodiments, the output format of the static infrared thermal video is PAL, and a time period for capturing the static infrared thermal video is ranged around 5-10 seconds.

In some embodiments of the method, the grayscale image of the infrared thermal image can be based on a color model of RGB, and the step of determining histograms based on grayscale image of the infrared thermal image; determining segmentation thresholds of the infrared image based on the histograms; and extracting a contour based on the segmentation thresholds can comprise the following sub-steps:

Obtaining greyscale images of red component, greyscale images of green component, and inverted greyscale images of blue component of each pixel in the infrared thermal image; generating histograms of the red component, the green component, and the blue component respectively based on the grayscale images of the red component, the greyscale images of the green component, and the inverted greyscale images of the blue component; calculating segmentation thresholds of the greyscale images of the red component, segmentation thresholds of the greyscale images of the green component, and segmentation thresholds of the inverted greyscale images of the blue component, respectively, based on the histograms of the red component, the green component and the blue component; and extracting a contour of the infrared thermal image based on the segmentation thresholds of the greyscale images of the red component, the segmentation thresholds of the greyscale images of the green component, and the segmentation thresholds of the inverted greyscale images of the blue component.

In some of the above embodiments, the sub-step of obtaining greyscale images of red component, greyscale images of green component, and inverted greyscale images of blue component of each pixel in the infrared thermal image can comprise: extracting the image of the infrared thermal image to obtain the greyscale image of the red component, the greyscale image of the green component, and the greyscale image of the blue component; and inverting the blue component of each pixel in the greyscale image of the blue component to obtain the inverted greyscale image of the blue component; or inverting the blue component of each pixel in the infrared thermal image; and extracting the greyscale image of the red component, the greyscale image of the green component, and the greyscale image of the blue component in the infrared thermal image after the blue component is inverted.

In some of the above embodiments, the sub-step of calculating segmentation thresholds of the greyscale images of the red component, segmentation thresholds of the greyscale images of the green component, and segmentation thresholds of the inverted greyscale images of the blue component respectively is through a segmentation threshold algorithm selected from one of the Otsu's method, the double-peak method, or the iterative method.

In some of the above embodiments, the sub-step of extracting a contour of the infrared thermal image comprises: querying in the infrared thermal image and comparing the segmentation thresholds of the greyscale image of the red component with the segmentation thresholds of the inverted greyscale image of the blue component to obtain segmentation coordinates of the inverted greyscale image of the blue component that are different from those of the greyscale image of the red component; comparing the different segmentation coordinates with the segmentation coordinates of the greyscale image of the green component, and if matching, retaining the different segmentation coordinates, otherwise removing the different segmentation coordinates; and extracting and displaying the contour of the infrared thermal image using the segmentation coordinates of the greyscale image of the red component and the segmentation coordinates of the inverted greyscale image of the retained blue component as windows.

In some embodiments, the step of determining histograms based on grayscale image of the infrared thermal image; determining segmentation thresholds of the infrared image based on the histograms; and extracting a contour based on the segmentation thresholds further comprises: performing binarization of the infrared thermal image after completing contour extraction to obtain a black-and-white infrared thermal image contour.

In a second aspect, the present disclosure provides an apparatus for infrared thermal image contour extraction. The apparatus can include: an image acquisition circuit, configured to capture an infrared thermal image; and a processing circuit, configured to determine histograms based on greyscale images of the infrared thermal image, to determine segmentation thresholds of the infrared thermal image based on the histograms, and to extract a contour based on segmentation thresholds.

In some embodiments of the apparatus, the image acquisition circuit comprises: a video capturing module, configured to capture an static infrared thermal video comprising a plurality of frames of infrared thermal image; a video decoding module, configured to perform analog/digital conversion of the static infrared thermal video and to decode, whereby the analog infrared thermal video is converted into a digital infrared video for extraction of a plurality of frames of digital infrared thermal images; a data storage module, configured to store the plurality of frames of digital infrared thermal image; and an image calculation module, configured to calculate an average of the plurality of frames of digital infrared thermal image to obtain one frame of the infrared thermal image.

The output format of the video capturing module can be PAL, NTSC, or NECAM. The time period for capturing the static infrared thermal video by the video capturing module can be set to be ranged around 5-10 seconds.

In some embodiments of the apparatus, the processing circuit can include: a greyscale image acquisition module, configured for greyscale images of red component, greyscale images of green component, and inverted greyscale images of blue component of each pixel in the infrared thermal image obtained by the image acquisition circuit; a histogram generation module, configured to generate histograms of the red component, the green component, and the blue component respectively based on the grayscale images of the red component, the greyscale images of the green component, and the inverted greyscale images of the blue component; a segmentation threshold calculation module, configured to calculate segmentation thresholds of the greyscale images of the red component, segmentation thresholds of the greyscale images of the green component, and segmentation thresholds of the inverted greyscale images of the blue component, respectively, based on the histograms of the red component, the green component and the blue component; and a contour extraction module, configured to extract a contour of the infrared thermal image based on the segmentation thresholds of the greyscale images of the red component, the segmentation thresholds of the greyscale images of the green component, and the segmentation thresholds of the inverted greyscale images of the blue component.

The segmentation threshold calculation module can be configured to calculate using a segmentation threshold algorithm selected from one of the Otsu's method, the double-peak method, or the iterative method.

In some embodiments of the apparatus, the contour extraction module can comprise: a first determining sub-module, configured to compare the segmentation coordinates of the greyscale image of the red component with the segmentation coordinates of the inverted greyscale image of the blue component to obtain segmentation coordinates of the inverted greyscale image of the blue component that are different from those of the greyscale image of the red component; a second determining sub-module, configured to compare the segmentation coordinates of the inverted greyscale image of the blue component that are different from those of the greyscale image of the red component with the segmentation coordinates of the greyscale image of the green component, and if matching, retaining the different segmentation coordinates, otherwise removing the different segmentation coordinates; and a display sub-module, configured to extract and display the contour of the infrared thermal image using the segmentation coordinates of the greyscale image of the red component and the segmentation coordinates of the inverted greyscale image of the retained blue component as windows.

In some embodiments, the apparatus can further include a black-and-white image processing circuit, configured to perform binarization of the infrared thermal image after completing contour extraction to obtain a black-and-white infrared thermal image contour.

The present disclosure has the following beneficial effects:

The method for infrared thermal image contour extraction provided by embodiments of the present disclosure can effectively reduce error and give prominence to effective information to provide more precise image for subsequent contour extraction through calculating the average of the multiple frames of human body static thermal infrared video; because the temperature of the human body is higher than the temperature of the environment, the thresholds of the edge of the human body can be calculated through histogram statistics, the extraction of the contour of human body can be achieved through threshold segmentation and the window extraction method of the segmentation thresholds of the red, green and blue components, the precise contour of the human body is obtained.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based on these drawings.

FIG. 3 is a detailed flow chart of step S1 in Embodiment 1 of the present disclosure;

FIG. 4 is a detailed flow chart of step S5 in Embodiment 1 of the present disclosure;

DETAILED DESCRIPTION

In the following, with reference to the drawings of various embodiments disclosed herein, the technical solutions of the embodiments of the disclosure will be described in a clear and fully understandable way. It is obvious that the described embodiments are merely a portion but not all of the embodiments of the disclosure. Based on the described embodiments of the disclosure, those ordinarily skilled in the art can obtain other embodiment(s), which come(s) within the scope sought for protection by the disclosure.

Embodiment 1

Figure 1:
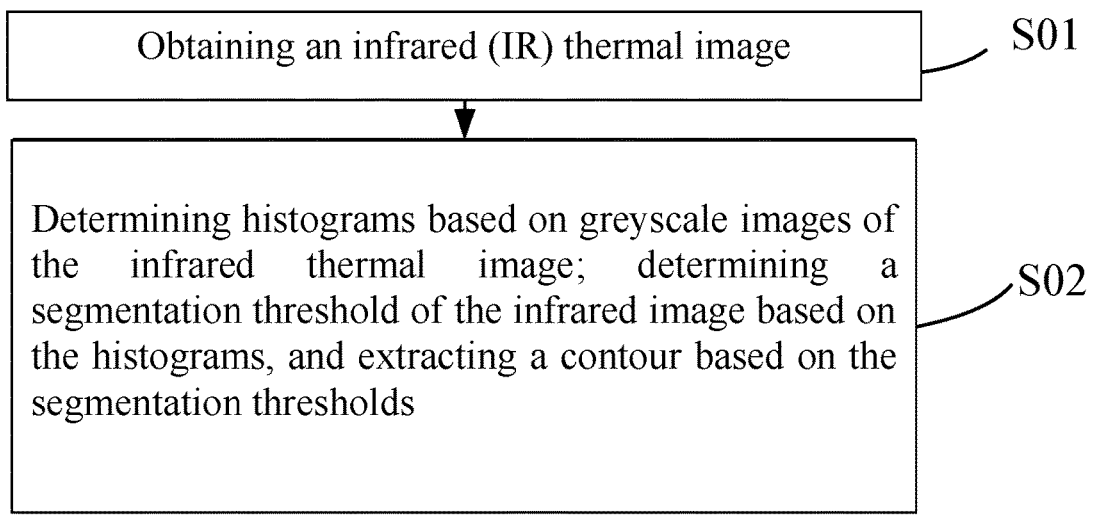
FIG. 1 is a flow chart of a method for infrared thermal image contour extraction according to Embodiment 1 of the present disclosure.

With reference to FIG. 1, the present disclosure provides a method for infrared thermal image contour extraction, which comprises the following steps.

S01: Obtaining an infrared (IR) thermal image;

S02: Determining histograms based on greyscale images of the infrared thermal image, determining a segmentation threshold of the infrared image based on the histograms, and extracting a contour based on the segmentation threshold.

Specifically, obtaining of an infrared thermal image can be acquisition of one or more than one frames of infrared thermal image of a human body or a portion of the human body (for example, the face). When extracting a contour, the greyscale images of several types of color model (for example, RGB three primary colors or other types of color model) can be determined based all pixels of the above-obtained infrared thermal image, the histograms can be determined based on the greyscale images, and the contour can be extracted based on the histograms that are determined.

In the method provided by the embodiment of the present disclosure, because the temperature of the human body is higher than the temperature of the environment, through histogram statistics of infrared thermal image, the thresholds of the edge of human body can be calculated, and the thresholds is further segmented to extract the contour of the human body, thereby the precise contour of the human body can be obtained.

Figure 2:
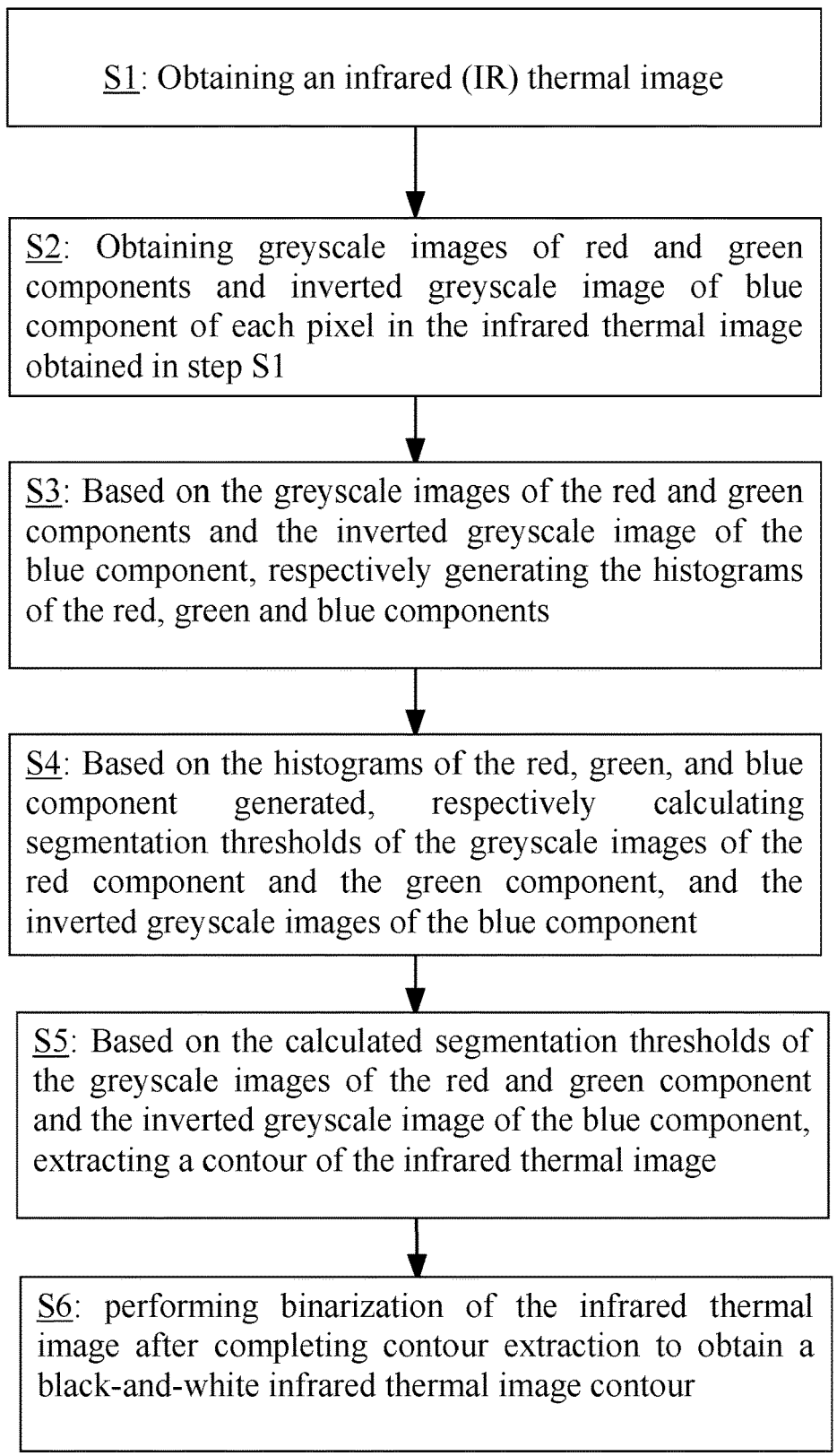
FIG. 2 is a detailed flow chart of the method for infrared thermal image contour extraction according to Embodiment 1 of the present disclosure.

With reference to FIG. 2, the following is an illustration of the method for infrared thermal image contour extraction of the present disclosure using RGB three primary colors as an example.

Step 1 (S1): obtaining an infrared thermal image.

The purpose of obtaining an infrared thermal image is to determine the target image for contour extraction. The infrared thermal image can be an image whose temperature is higher than the temperature of the environment such as image of a human body, image of an animal. In this embodiment of the present disclosure, contour extraction for a human body image is used as an example. This is not a limitation to this embodiment of the present disclosure.

With reference to FIG. 3, the step S1 specifically comprises the following sub-steps:

S11: Capturing a Static Infrared Thermal Video Comprising Multiple Frames of the Infrared Thermal Image Through a Video Capturing Module.

Specifically, the video capturing module can output PAL or NTSC format.

For example, when adopting the PAL output format, the frame rate is 25 Hz, the field rate is 50 Hz. In this case, only 5-10 seconds are needed to capture 250-500 frames of image, thereby a sufficient number of images can be provided for subsequent calculation of the average of multiple frames to reduce errors. If the video capturing module employs a digital video camera, the digital infrared thermal images can be outputted directly.

S12: Performing decoding and analog/digital conversion of the infrared thermal video comprising multiple frames of infrared thermal images obtained from step S11 through a video decoding module, to convert the analog infrared thermal images into digital infrared thermal images, and storing the digital infrared thermal images in a data storage module.

S13: Calculating an average of multiple frames of the digital infrared thermal images to obtain one frame of the infrared thermal image through an image calculation module, that is, to obtain the target image that will be used for contour extraction.

Calculation of the average of multiple frames of the digital infrared thermal image in step S13 is purported for reducing errors, highlighting effective information for the infrared thermal image, and providing more precise image for subsequent contour extraction.

Step 2 (S2): Obtaining greyscale images of red and green components and inverted greyscale image of blue component of each pixel in the infrared thermal image obtained in step S1.

It should be noted that the color of infrared thermal image can represent the temperature of objects. Specifically, because the temperature of human body surface is around 31-35° C. and the temperature of the environment is around 21-25° C., in the infrared thermal image, the color of the human body region has apparent difference from the color of the surrounding environment. In light of the characteristics of thermal images, the higher the temperature, the closer to red the color of the image (i.e., the red component is higher); the lower the temperature, the closer to blue the color of the image (i.e., the blue component is higher). As such, the trend of the red component is the same as the trend of the temperature, whereas the trend of the blue component is opposite to the trend of the temperature.

In order to improve the efficiency of contour extraction, in this embodiment, the color of the blue component is inverted (color inversion refers to the highest greyscale value minus the current greyscale value in the blue component). In this regard, the trend of the inverted blue component is the same as the trend of the temperature. As such, the same calculation method can be configured to calculate the segmentation thresholds of the greyscale images of the red component and the blue component, thereby the efficiency of the segmentation threshold calculation can be improved, and the efficiency of the infrared thermal image contour extraction can be improved.

Step S2 can specifically comprise the following sub-steps: First, extracting the image of the infrared thermal image obtained in step S1 to obtain the greyscale image of the red component, the greyscale image of the green component, and the greyscale image of the blue component; thereafter, inverting each of the blue components (the blue components in each pixel?) in the greyscale image of the blue component to obtain the inverted greyscale image of the blue component.

Alternatively, first, inverting the blue component of each pixel in the infrared thermal image obtained in step S1; thereafter, extracting the greyscale image of the red component, the greyscale image of the green component, and the greyscale image of the blue component in the infrared thermal image after the blue component is inverted.

Step 3 (S3): Based on the greyscale images of the red and green components and the inverted greyscale image of the blue component, respectively generating the histograms of the red, green and blue components.

A color histogram is a characteristic of colors that is widely used in many image retrieval systems. It describes the percentage of different colors in the whole image, and it does not concern the special position of each colors, and thus it cannot describe the objects in the image. A color histogram is especially suitable to describe the image that is difficult for automatic segmentation. In this embodiment, color histograms are configured to segment the contour of the human body.

Specifically, step S3 can comprise the following sub-step: based on the greyscale image of the red component, the greyscale image of the green component, and the inverted greyscale image of the blue component obtained in step S2, obtaining the distribution of the greyscale values of each red component, green component and inverted blue component, to thereby generate the histograms of the red component, green component and blue component through a histogram generation module.

Step 4 (S4): Based on the histograms of the red, green, and blue component generated, respectively calculating segmentation thresholds of the greyscale images of the red component and the green component, and the inverted greyscale images of the blue component.

Specifically, step S4 can comprises: based on the histograms of the red, green and blue components generated in step S3, calculating respectively the segmentation thresholds of the greyscale images of the red component and the green component, and the inverted greyscale image of the blue component through the Otsu's method. The Otsu's method is simple and convenient to use, has a light computational burden, and has a high calculation accuracy. The calculation of segmentation thresholds is not limited to employing Otsu's method, other segmentation threshold algorithms such as double-peak method and iterative method, can also be used. The specific implementation of these algorithms will not be described in details herein.

Step 5 (S5): Based on the calculated segmentation thresholds of the greyscale images of the red and green component and the inverted greyscale image of the blue component, extracting a contour of the infrared thermal image.

With reference to FIG. 4, step S5 specifically comprises the following sub-steps:

S51: Querying in the infrared thermal image and comparing the segmentation thresholds of the greyscale image of the red component and the segmentation thresholds of the inverted greyscale image of the blue component to obtain the segmentation coordinates of the inverted greyscale image of the blue component that are different from the segmentation coordinates of the greyscale image of the red component.

For example, 20 points of segmentation coordinates are obtained for the greyscale image of the red component (one point represents one pixel) after calculation, and 30 points of segmentation coordinates are obtained for the inverted greyscale image of the blue component. If 10 points of segmentation coordinates of the inverted greyscale image of the blue component are found to be different from the segmentation coordinates of the greyscale image of the red component, these 10 points of segmentation coordinates are recorded.

S52: Comparing the different segmentation coordinates with the segmentation coordinates of the greyscale image of the green component, and if the different segmentation coordinates match the segmentation coordinates of the greyscale image of the green component, retaining the different segmentation coordinates, otherwise removing them.

In this step, the 10 points of segmentation coordinates that are different are compared with the segmentation coordinates of the greyscale image of the green component; if one segmentation coordinates in the greyscale image of the green component is found to be the same as a segmentation coordinate in the 10 points, this point is retained; otherwise, this point is removed.

S53: Using the segmentation coordinates of the greyscale image of the red component and the segmentation coordinates of the inverted greyscale image of the retained blue component as windows, extracting and displaying the contour of the infrared thermal image.

In this step, the 20 points of segmentation coordinates of the greyscale image of the red component, and the segmentation coordinates of the inverted greyscale image of the blue component that are finally obtained, are extracted from the infrared thermal image obtained in step S1, to ultimately realize infrared thermal image contour extraction and display.

In this step, the segmentation coordinates of the greyscale image of the red component and the segmentation coordinates of the inverted greyscale image of the blue component are compared. If the segmentation coordinates of the inverted greyscale image of the blue component are exactly the same as the segmentation coordinates of the greyscale image of the red component, the contour of the infrared thermal image can be extracted and displayed directly using the segmentation coordinates of the greyscale image of the red component as the window.

The image obtained in step S5 is a color image, and depending on the subsequent needs, it can be processed to convert into a black-and-white image. In other words, the method can further comprise step 6 (S6), i.e., performing binarization of the infrared thermal image after completing contour extraction to obtain a black-and-white infrared thermal image contour.

The method for infrared thermal image contour extraction as described in this embodiment of the present disclosure, by calculating an average of multiple frames of a static infrared thermal video of human body, can effectively reduce errors, highlight effective information, and provide more precise images for subsequent contour extraction.

Because the temperature of the human body is higher than the temperature of the surrounding environment, the thresholds of the edge of the human body can be calculated by histogram statistics of the image, and the human body contour extraction can be further realized and the precise contour of the human body can be ultimately obtained by thresholds segmentation and the extraction method of the segmentation thresholds window of the red component, the green component, and the blue component.

Embodiment 2

Figure 5:
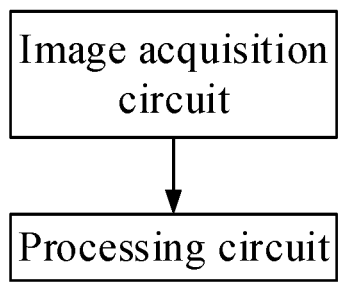
FIG. 5 is a structural view of an apparatus for infrared thermal image contour extraction according to Embodiment 2 of the present disclosure.

With reference to FIG. 5, the present disclosure provides an infrared thermal image contour extraction apparatus. The apparatus can adopt the infrared thermal image contour extraction method as described in Embodiment 1 to extract the contour. Specifically, the infrared thermal image contour extraction apparatus comprises an image acquisition circuit and a processing circuit.

The image acquisition circuit is configured to acquire infrared thermal images to determine the target images from which the contour will be extracted. The infrared thermal images can be images of human body, and can also be images of animals whose temperature are higher than the temperature of the environment. In this embodiment, images of human body are used as an example for illustration.

This is not a limitation to the embodiment of the present disclosure.

Figure 6:
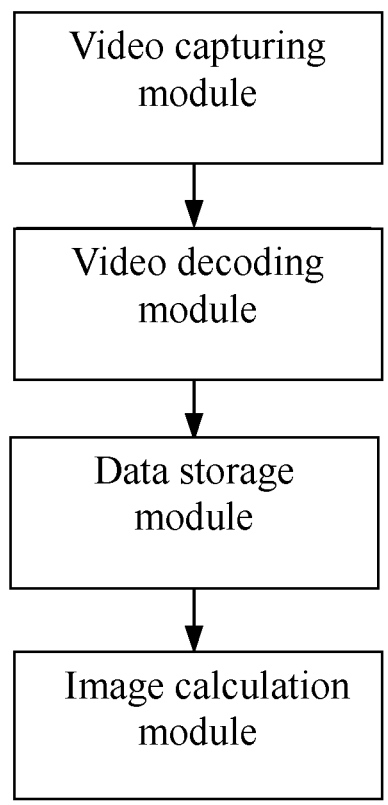
FIG. 6 is a detailed structural view of the apparatus for infrared thermal contour extraction according to Embodiment 2 of the present disclosure.

With reference to FIG. 6, the image acquisition circuit in the embodiment specifically comprises: a video capturing module, a video decoding module, a data storage module, and an image calculation module.

Specifically, the video capturing module is configured to capture static infrared thermal videos. An infrared thermal video comprises multiple frames of infrared thermal image. Specifically, the output format of the video capturing module is PAL or NTSC format. The video capturing module can be digital video cameras. For example, when PAL format is adopted, the frame rate is 25 Hz, the field rate is 50 Hz, and in this case, only 5-10 seconds are needed to capture 250-500 frames of image, to thereby provide sufficient number of images for subsequent calculation of the average of multiple frames to reduce errors.

The video decoding module is configured to convert the infrared thermal video (multiple infrared thermal images) captured by the video capturing module from analog format to digital format and decode, whereby the analog infrared thermal video is converted into a digital infrared video, and a plurality of frames of digital infrared thermal images are extracted from the digital infrared video.

The data storage module is configured to store the digital infrared thermal images converted by the video decoding module.

The image calculation module is configured to calculate the average of the multiple frames of infrared thermal image stored in the data storage module to obtain one frame of infrared thermal image, i.e., obtain the target image that will be used for contour extraction.

Figure 7:
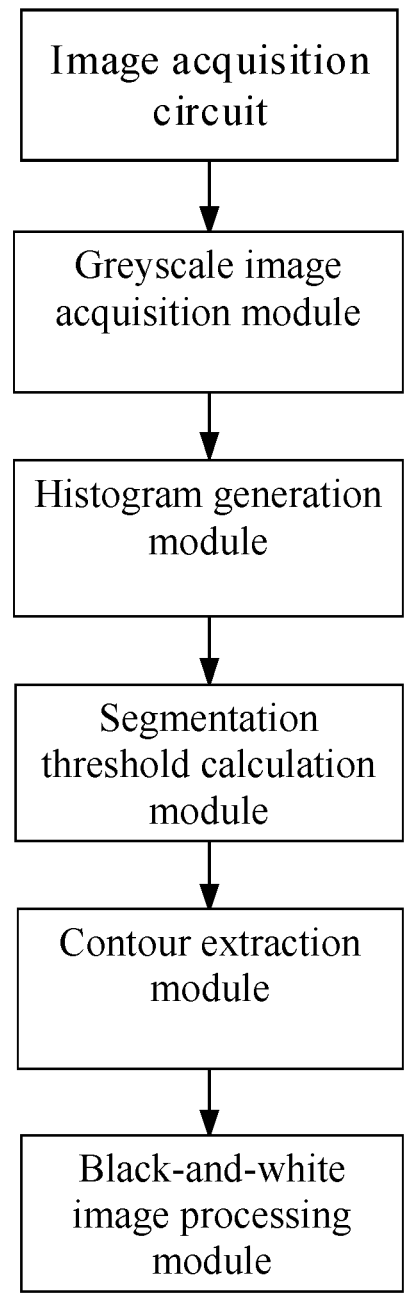
FIG. 7 is a detailed structural view of the image acquisition circuit in Embodiment 2 of the present disclosure.

The processing circuit is configured to determine the histograms based on the greyscale images of the infrared thermal image, to determine the segmentation thresholds of the infrared thermal image based on the histograms, and to extract the contour based on the segmentation thresholds. As shown in FIG. 7, the processing circuit specifically comprises: a greyscale image acquisition module, a histogram generation module, a segmentation threshold calculation module, and a contour extraction module.

The greyscale image acquisition module is configured for the greyscale images of the red, green components and the inverted greyscale image of the blue component of each pixel of the infrared thermal image captured by the image acquisition circuit.

It should be noted that the color of the infrared thermal image can represent the temperature of objects. Specifically, because the temperature of the surface of human body is around 31-35° C., and the temperature of the environment is around 21-25° C., in the infrared thermal image, the color of the human body area has apparent difference from the color of the surrounding environment. In light of the characteristics of thermal images, the higher the temperature, the closer to red the color of the image, i.e., the red component is higher; the lower the temperature, the closer to blue the color of the image, i.e., the blue component is higher.

As such, the trend of the red component is the same as the trend of the temperature, and the trend of the blue component is the opposite to the trend of the temperature. In order to improve the efficiency of contour extraction, in this embodiment, the color of the blue component is inverted (color inversion refers to the highest greyscale value minus the current greyscale value in the blue component). In this case, the trend of the inverted blue component is the same as the trend of the temperature, thus a same calculation method can be configured to calculate the segmentation thresholds of the greyscale images of the red component and the blue component.

The greyscale image acquisition module as disclosed in this embodiment of the present disclosure is specifically configured for the following purposes. First, the infrared thermal image obtained by the image acquisition circuit is extracted to obtain the greyscale image of the red component, the greyscale image of the green component, and the greyscale image of the blue component. Next, each of the blue components in the greyscale image of the blue component is inverted to obtain the inverted greyscale image of the blue component.

Alternatively, first, the blue component of each pixel in the infrared thermal image obtained in the image acquisition circuit is inverted. Next the greyscale image of the red component, the greyscale image of the green component, and the greyscale image of the blue component in the infrared thermal image are extracted after the blue components are inverted.

The histogram generation module is configured to generate respectively the histogram of the red component, the histogram of the green component, and the histogram of the blue component, based on the greyscale image of the red component, the greyscale image of the green component, and the inverted greyscale image of the blue component obtained by the greyscale image acquisition module.

Specifically, a color histogram is a color characteristic that is widely used in many image retrieval systems. It describes the percentage of different color in the whole image, and it does not concern the position of each color, i.e., it cannot describe the objects in the image. Color histogram is especially suitable to describe the images that are difficult for automatic segmentation. In this embodiment, the color histogram is configured to segment the contour of a human body.

The histogram generation module is specifically configured to obtain the distribution of the greyscale value of each red component, green component and inverted blue component, based on the greyscale image of the red component, the greyscale image of the green component, and the inverted greyscale image of the blue component obtained by the greyscale image acquisition unit, thereby generate the histograms of the red component, green component, and blue component.

The segmentation threshold calculation module is configured to calculate the segmentation thresholds of the greyscale images of the red and green components and the inverted greyscale image of the blue components, based on the histograms of the red, green, and blue components.

Specifically, the segmentation threshold calculation module is configured for: based on the histograms of the red component, green component, and blue component, respectively calculating the segmentation thresholds of the greyscale images of the red and green components and the inverted greyscale image of the blue component through the Otsu's method. The segmentation calculation circuit is not limited to calculate the segmentation thresholds through the Otsu's method, other segmentation methods such as the double-peak method, the iterative method can also be used. The segmentation thresholds of the greyscale image of the red component, of the greyscale image of the green component, and of the inverted greyscale image of the blue component are respectively calculated by the same method.

The specific implementation of theses calculation methods will not be described in details herein.

The contour extraction module is configured to extract the contour of the infrared thermal image based on the segmentation thresholds of the greyscale images of the red and green components and the inverted greyscale image of the blue component that are calculated by the segmentation threshold calculation module.

Figure 8:
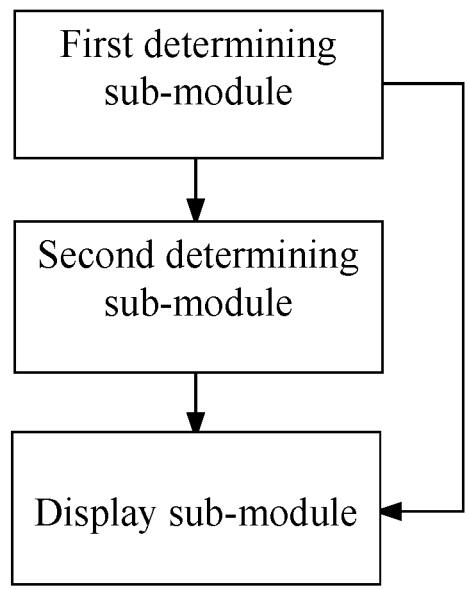
FIG. 8 is a detailed structural view of the contour extraction module in Embodiment 2 of present disclosure.

Specifically, the contour extraction module is configured to extract the contour of the infrared thermal image using the segmentation thresholds of the greyscale images of the red and green components and the inverted greyscale image of the blue component as windows. As shown in FIG. 8, the contour extraction module comprises a first determining sub-module, a second determining sub-module and a display sub-module.

The first determining sub-module is configured to compare the segmentation coordinates of the greyscale image of the red component and the inverted greyscale image of the blue component, so as to obtain the segmentation coordinates in the segmentation coordinates of the inverted greyscale image of the blue component that are different from the segmentation coordinates of the greyscale image of the red component.

For example, the segmentation threshold calculation module obtains 20 points (each point represents a pixel) of segmentation coordinates of the greyscale image of the red component, and obtains 30 points of segmentation coordinates of the inverted greyscale image of the blue component. In this case, the first determining sub-module determines that there are 10 points of segmentation coordinates of the inverted greyscale image of the blue component that are different from the segmentation coordinates of the greyscale image of the red component, and records these 10 points of segmentation coordinates.

The second determining sub-module is configured to compare the segmentation coordinates that are different with the segmentation coordinates of the greyscale image of the green component: if the segmentation coordinates that are different match the segmentation coordinates of the greyscale image of the green component, retain the segmentation coordinates that are different, otherwise remove them.

Following the above example, the second determining sub-module compares the 10 points of segmentation coordinates and the segmentation thresholds of the greyscale image of the green component: if a segmentation coordinate in the segmentation coordinates of the greyscale image of the green component that is same as any segmentation coordinate within the 10 points, retain this point, if not found, remove it.

The display sub-module is configured to extract the contour of the infrared thermal image and display it using the segmentation coordinates of the greyscale image of the red component and retained segmentation coordinates of the inverted greyscale image of the blue component as windows.

The first determining sub-module compares the segmentation coordinates of the greyscale image of the red component and the inverted greyscale image of the blue component, if the segmentation coordinates of the inverted greyscale image of the blue component is exactly same as the segmentation coordinates of the greyscale image of the red component, the segmentation coordinates of the greyscale image of the red component can be used directly as windows for extracting the contour of the infrared thermal image and displaying it through the display sub-module.

In this case, the image the contour extraction module extracts is color image. Based on the needs of subsequent work, it can further comprise a process that converts the color contour image into black and white, i.e., it can further comprise a black-and-white image processing module, which is configured to binarize the infrared thermal image after the contour extraction is completed to obtain the black-and-white infrared thermal image contour.

The infrared thermal image contour extraction apparatus as described in the embodiment of the present disclosure, by calculating the average of multiple frames of the image of the static infrared thermal video of a human body, can effectively reduce errors, highlight effective information, and provide more precise image for subsequent contour extraction.

Because the temperature of the human body is higher than the temperature of the surrounding environment, through histogram of statistics of the image, the thresholds for the edge of the human body can be calculated. Through threshold segmentation and the segmentation threshold window of the red component, green component, and blue component, the contour extraction of human body can be realized to obtain precise contour of the human body.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for infrared thermal image contour extraction, comprising:
    obtaining an infrared thermal image; and
    determining histograms based on grayscale image of the infrared thermal image; determining segmentation thresholds of the infrared image based on the histograms; and extracting a contour based on the segmentation thresholds;
    wherein:
    the grayscale image of the infrared thermal image is based on a color model of RGB; and
    the determining histograms based on grayscale image of the infrared thermal image; determining segmentation thresholds of the infrared image based on the histograms; and extracting a contour based on the segmentation thresholds comprises:
    obtaining greyscale images of red component, greyscale images of green component, and inverted greyscale images of blue component of each pixel in the infrared thermal image;
    generating histograms of the red component, the green component, and the blue component respectively based on the grayscale images of the red component, the greyscale images of the green component, and the inverted greyscale images of the blue component;
    calculating segmentation thresholds of the greyscale images of the red component, segmentation thresholds of the greyscale images of the green component, and segmentation thresholds of the inverted greyscale images of the blue component, respectively, based on the histograms of the red component, the green component and the blue component; and extracting a contour of the infrared thermal image based on the segmentation thresholds of the greyscale images of the red component, the segmentation thresholds of the greyscale images of the green component, and the segmentation thresholds of the inverted greyscale images of the blue component.

2. The method of claim 1, wherein the obtaining an infrared thermal image comprises:

capturing a static infrared thermal video comprising a plurality of frames of the infrared thermal image;

performing decoding and analog/digital conversion of the static infrared thermal video, and storing a plurality of frames of digital infrared thermal images obtained from the analog/digital conversion; and calculating an average of the plurality of frames of digital infrared thermal images to obtain one frame of the infrared thermal image.

3. The method of claim 2, wherein an output format of the static infrared thermal video is PAL, NTSC, or NECAM.

4. The method of claim 2, wherein the output format of the static infrared thermal video is PAL, and a time period for capturing the static infrared thermal video is ranged around 5-10 seconds.

5. The method of claim 1, wherein the obtaining greyscale images of red component, greyscale images of green component, and inverted greyscale images of blue component of each pixel in the infrared thermal image comprises:

extracting the image of the infrared thermal image to obtain the greyscale image of the red component, the greyscale image of the green component, and the greyscale image of the blue component; and inverting the blue component of each pixel in the greyscale image of the blue component to obtain the inverted greyscale image of the blue component; or inverting the blue component of each pixel in the infrared thermal image; and extracting the greyscale image of the red component, the greyscale image of the green component, and the greyscale image of the blue component in the infrared thermal image after the blue component is inverted.

6. The method of claim 1, wherein the calculating segmentation thresholds of the greyscale images of the red component, segmentation thresholds of the greyscale images of the green component, and segmentation thresholds of the inverted greyscale images of the blue component respectively is through a segmentation threshold algorithm selected from one of the Otsu's method, the double-peak method, or the iterative method.

7. The method of claim 1, wherein the extracting a contour of the infrared thermal image comprises:

querying in the infrared thermal image and comparing the segmentation thresholds of the greyscale image of the red component with the segmentation thresholds of the inverted greyscale image of the blue component to obtain segmentation coordinates of the inverted greyscale image of the blue component that are different from those of the greyscale image of the red component;

comparing the different segmentation coordinates with the segmentation coordinates of the greyscale image of the green component, and if matching, retaining the different segmentation coordinates, otherwise removing the different segmentation coordinates; and extracting and displaying the contour of the infrared thermal image using the segmentation coordinates of the greyscale image of the red component and the segmentation coordinates of the inverted greyscale image of the retained blue component as windows.

8. The method of claim 1, wherein the determining histograms based on grayscale image of the infrared thermal image; determining segmentation thresholds of the infrared thermal image based on the histograms; and extracting a contour based on the segmentation thresholds further comprises: performing binarization of the infrared thermal image after completing contour extraction to obtain a black-and-white infrared thermal image contour.

9. An apparatus for infrared thermal image contour extraction, comprising:

an image acquisition circuit, configured to capture an infrared thermal image; and a processing circuit, configured to determine histograms based on greyscale images of the infrared thermal image, to determine segmentation thresholds of the infrared thermal image based on the histograms, and to extract a contour based on segmentation thresholds;

wherein the processing circuit comprises:

a greyscale image acquisition module, configured for greyscale images of red component, greyscale images of green component, and inverted greyscale images of blue component of each pixel in the infrared thermal image obtained by the image acquisition circuit;

a histogram generation module, configured to generate histograms of the red component, the green component, and the blue component respectively based on the qrayscale images of the red component, the greyscale images of the green component, and the inverted greyscale images of the blue component;

a segmentation threshold calculation module, configured to calculate segmentation thresholds of the greyscale images of the red component, segmentation thresholds of the greyscale images of the green component, and segmentation thresholds of the inverted greyscale images of the blue component, respectively, based on the histograms of the red component, the green component and the blue component; and a contour extraction module, configured to extract a contour of the infrared thermal image based on the segmentation thresholds of the greyscale images of the red component, the segmentation thresholds of the greyscale images of the green component, and the segmentation thresholds of the inverted greyscale images of the blue component.

10. The apparatus according to claim 9, wherein the image acquisition circuit comprises:

a video capturing module, configured to capture a static infrared thermal video comprising a plurality of frames of infrared thermal image;

a video decoding module, configured to perform analog/digital conversion of the static infrared thermal video and to decode, whereby the analog infrared thermal video is converted into a digital infrared video for extraction of a plurality of frames of digital infrared thermal images;

a data storage module, configured to store the plurality of frames of digital infrared thermal image; and an image calculation module, configured to calculate an average of the plurality of frames of digital infrared thermal image to obtain one frame of the infrared thermal image.

11. The apparatus according to claim 10, wherein an output format of the video capturing module is PAL, NTSC, or NECAM.

12. The apparatus according to claim 10, wherein a time period for capturing the static infrared thermal video by the video capturing module is set to be ranged around 5-10 seconds.

13. The apparatus according to claim 9, wherein the segmentation threshold calculation module is configured to calculate using a segmentation threshold algorithm selected from one of the Otsu's method, the double-peak method, or the iterative method.

14. The apparatus according to claim 9, wherein the contour extraction module comprises:
- a first determining sub-module, configured to compare the segmentation coordinates of the greyscale image of the red component with the segmentation coordinates of the inverted greyscale image of the blue component to obtain segmentation coordinates of the inverted greyscale image of the blue component that are different from those of the greyscale image of the red component;
- a second determining sub-module, configured to compare the segmentation coordinates of the inverted greyscale image of the blue component that are different from those of the greyscale image of the red component with the segmentation coordinates of the greyscale image of the green component, and if matching, retaining the different segmentation coordinates, otherwise removing the different segmentation coordinates; and
- a display sub-module, configured to extract and display the contour of the infrared thermal image using the segmentation coordinates of the greyscale image of the red component and the segmentation coordinates of the inverted greyscale image of the retained blue component as windows.

15. The apparatus according to claim 9, further comprising a black-and-white image processing circuit, configured to perform binarization of the infrared thermal image after completing contour extraction to obtain a black-and-white infrared thermal image contour.

* * * * *